United States Patent
Kolli et al.

(10) Patent No.: US 11,487,725 B2
(45) Date of Patent: Nov. 1, 2022

(54) DATA ENRICHMENT AND MATCHING

(71) Applicant: Pronto Technology, Inc., Cupertino, CA (US)

(72) Inventors: Swaroop Kolli, San Jose, CA (US); Suresh Kumar Batchu, Campbell, CA (US); Manoj Kumar, San Jose, CA (US)

(73) Assignee: Pronto Technology, Inc., Cupertino, CA (US)

(*) Notice: Subject to any disclaimer, the term of this patent is extended or adjusted under 35 U.S.C. 154(b) by 51 days.

(21) Appl. No.: 17/081,929

(22) Filed: Oct. 27, 2020

(65) Prior Publication Data

US 2021/0133169 A1    May 6, 2021

Related U.S. Application Data

(60) Provisional application No. 62/928,936, filed on Oct. 31, 2019.

(51) Int. Cl.
*G06F 16/215* (2019.01)
*G06F 16/2457* (2019.01)
*G06F 16/22* (2019.01)
*G06F 16/28* (2019.01)

(52) U.S. Cl.
CPC ......... *G06F 16/215* (2019.01); *G06F 16/221* (2019.01); *G06F 16/24573* (2019.01); *G06F 16/287* (2019.01)

(58) Field of Classification Search
CPC .............................. G06F 16/221; G06F 16/215
See application file for complete search history.

(56) References Cited

U.S. PATENT DOCUMENTS

| | | | |
|---|---|---|---|
| 6,282,537 | B1 | 8/2001 | Madnick |
| 2008/0288497 | A1* | 11/2008 | Watanabe ............ G06F 16/284 |
| 2012/0023107 | A1 | 1/2012 | Nachnani |
| 2013/0218911 | A1 | 8/2013 | Li |
| 2014/0067803 | A1 | 3/2014 | Kapadia |
| 2016/0092557 | A1 | 3/2016 | Stojanovic |
| 2017/0177626 | A1* | 6/2017 | Dupey ............... G06F 16/215 |
| 2018/0060603 | A1* | 3/2018 | Ahmed ............... G06F 16/284 |

(Continued)

OTHER PUBLICATIONS

Azeroual, Data Quality Measures and Data Cleansing for Research Information Systems, Feb. 2018, Journal of Digital Information Management, vol. 16, pp. 12-21.*

(Continued)

*Primary Examiner* — James Trujillo
*Assistant Examiner* — J Mitchell Curran
(74) *Attorney, Agent, or Firm* — Van Pelt, Yi & James LLP

(57) ABSTRACT

In an embodiment, a process for data enrichment and matching includes obtaining a first dataset associated with a first user from a first data source, where the first dataset includes records from a structured data source, and obtaining a corresponding second dataset associated with a second user. The process includes enriching at least one of the first dataset and the second dataset. The process includes merging the first dataset and the second dataset including by matching a set of attributes based at least in part on matching corresponding attributes, wherein at least one of the first dataset and the second dataset has been enriched. The process includes outputting the merged data.

19 Claims, 10 Drawing Sheets

(56) References Cited

U.S. PATENT DOCUMENTS

2018/0075115 A1* 3/2018 Murray ................ G06F 16/248
2018/0300390 A1* 10/2018 Burchard ............. G06F 16/285
2019/0294613 A1* 9/2019 Sullivan ............. G06F 16/2455
2019/0361900 A1* 11/2019 Rogynskyy ......... G06F 16/9024

OTHER PUBLICATIONS

Ed King, Data Enrichment Part VII: Match Test, Openrise, Dec. 1, 2017.

* cited by examiner

| Ecosystem/ | ▼ Select accounts from results and create datasets | | | 7 results found |
|---|---|---|---|---|
| Acme Corp | Account name ↑ Street | City | State | Country |
| ↓ | ☐ Company A   123 Main St. | -- | -- | USA |
| Customers | ☐ Company B   -- | Seattle | -- | USA |
| Accounts | ☐ Company C   -- | -- | -- | Germany |
| Datasets | ☐ Company D   -- | -- | CA | USA |
| | ☐ Company E   Corporate Dr. | -- | -- | USA |
| | ☐ Company F   -- | -- | -- | India |
| | ☐ Company G   -- | -- | -- | USA |

Select accounts from results to create dataset

Cancel    Create dataset

Ecosystem/
Acme Corp

↓

Customers
Accounts
Datasets

Datasets/
Sample dataset

Report | 7 accounts — 702

| Created | | | Owner |
| 21 Oct 2019 | | | 👤 User 1 |

| Last updated | | | Expires in | | Company |
| 21 Oct 2019 | | | 30 days | | Acme Corporation |

| | | | | | Enrichment |
| | | | | | Enriched |

| Account name | Street | City | State | Country |
|---|---|---|---|---|
| ☐ Company A | 123 Main St. | Sumner | WA | USA |
| ☐ Company B | 456 2nd Ave. | Seattle | WA | USA |
| ☐ Company C | Einer-allee 12 | Frankfurt | Hesse | Germany |
| ☐ Company D | 49 Gold Dr. | Eureka | CA | USA |

← 704

[Delete accounts]

FIG. 9

Ecosystem/
Acme Corp

Customers
Accounts
Datasets

Overlaps
Matching Criteria: Company name – Account, Website – Web address

| Company name ↑ (Src 1) | Type (Src 1) | Account Owner (Src 2) | Account (Src 2) | Account Type (Src 2) | Account Owner (Src 2) | Product (Src 2) |
|---|---|---|---|---|---|---|
| A Co. | Customer | contact@a.co | A Co. | Prospect | doe@a.co | Product 1 |
| B Co. | Prospect | tlead@b.co | B Co. | Customer | plead@b.co | Product 1 |
| C Co. | Customer | c_tact@c.co | C Co. | Customer | ct_act@c.co | Product 1 |
| D Co. | Customer | con.tact@d.co | D Co. | Customer | friend@d.co | Product 1 |
| E Co. | Lead | admin@e.co | E Co. | Lead | ads@e.co | Product 1 |
| F Co. | Prospect | account@f.co | F Co. | Prospect | acct@f.co | Product 1 |
| G Co. | Prospect | dept@g.co | G Co. | Customer | dept@g.co | Product 1 |

FIG. 10

DATA ENRICHMENT AND MATCHING

CROSS REFERENCE TO OTHER APPLICATIONS

This application claims priority to U.S. Provisional Patent Application No. 62/928,936 entitled DATA ENRICHMENT AND MATCHING filed Oct. 31, 2019 which is incorporated herein by reference for all purposes.

BACKGROUND OF THE INVENTION

Data storage systems such as customer relationship management (CRM) systems are useful for managing data records corresponding an organization's associates such as customers or prospective customers. Many different data storage systems exist today. Reconciling data from different systems is technically challenging because different storage systems may store datasets in different ways and use different structuring paradigms. Conventional techniques for combining distinct datasets are typically inaccurate or inefficient.

BRIEF DESCRIPTION OF THE DRAWINGS

Various embodiments of the invention are disclosed in the following detailed description and the accompanying drawings.

FIG. 4 shows an example of a graphical user interface for data enrichment and matching in a state for creating a dataset.

FIG. 5 shows an example of a graphical user interface for data enrichment and matching in a state after importing data prior to enrichment.

FIG. 7 shows an example of a graphical user interface for data enrichment and matching while enrichment is in progress.

FIG. 9 shows an example of a graphical user interface for data enrichment and matching in a state for matching results of datasets.

FIG. 10 shows an example of a graphical user interface for data enrichment and matching in a state for matching results of datasets.

DETAILED DESCRIPTION

Figure 1:
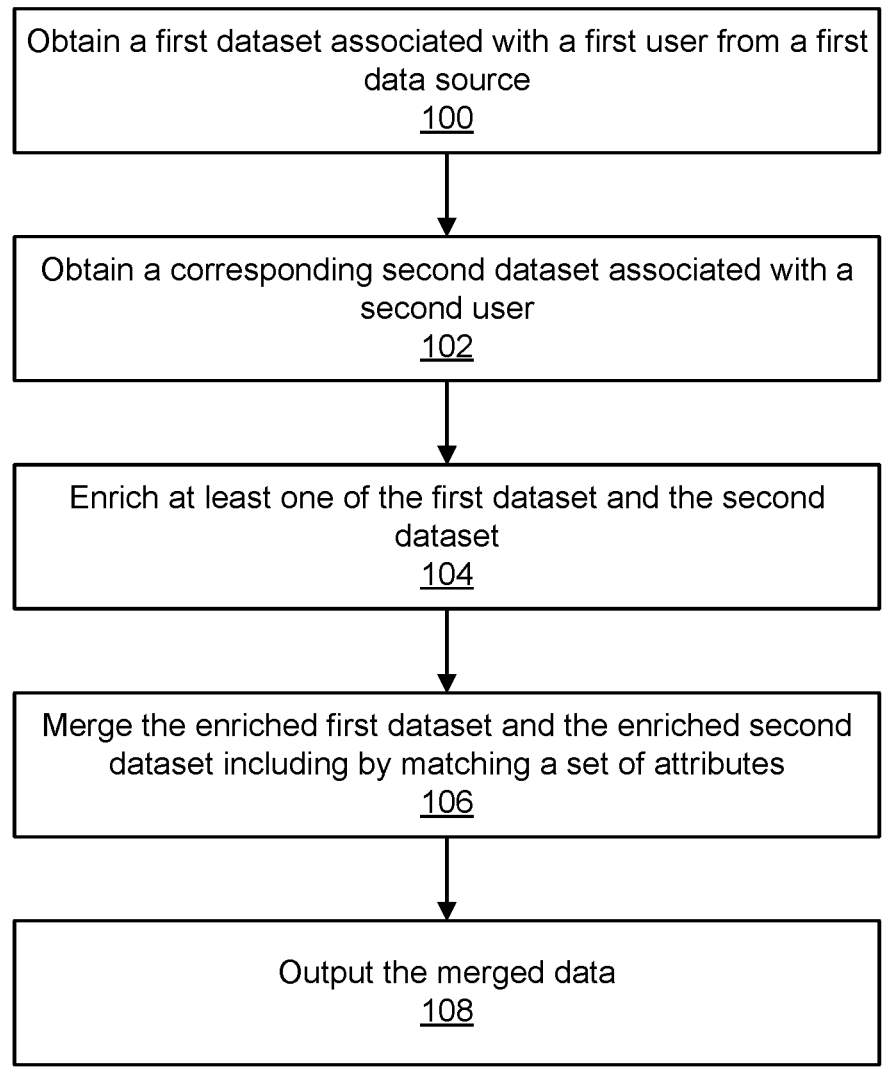
FIG. 1 is a flow diagram illustrating an embodiment of a process for data enrichment and matching.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Examples of contexts in which distinct datasets may be desired to be merged, compared, cross-collated, or the like include mergers, acquisitions, transitions to new data storage and management platforms, joint ventures, and other partnerships. For example, two organizations entering into a joint or other cooperative business venture may want to know which customers they have in common or which customers (e.g., of a certain type, having a specified attribute) of theirs or of the other organization are not common to the two organizations (e.g., are "distinct" to one or the other). They might also want to know who could be new potential customers based on their common or distinct customers.

Conventional approaches typically identify common or distinct records in datasets between two organizations as follows. A first user (associated with a first organization) exports data into a CSV or a Microsoft Excel® format and shares the exported data with a second user (associated with a second organization). The second user then compares the first user's data with the second user's data. The second user's data could be in a CSV, Excel®, or other report format. The second user typically performs the comparison manually row-by-row or using a script written a programming language such as Python. Thus, conventional methods for comparing distinct datasets is laborious, requiring extensive user or programmer involvement.

Techniques are disclosed to import, enrich, match, and securely/selectively share data from distributed/disparate data sources. In various embodiments, data from two or more datasets, e.g., sales account data or other data from two organizations in a joint or other cooperative venture, are imported, normalized, enriched, etc. and records from the datasets are compared to identify common and/or distinct records.

In various embodiments, a process for data enrichment and matching includes obtaining a first dataset associated with a first user from a first data source, where the first dataset includes entities associated with records from a structured data source (such as customer relationship management system, marketing automation system, or other structured data storage with enterprise/business logic). The process obtains a corresponding second dataset associated with a second user. The process enriches the first dataset and/or the second dataset, and merges the enriched first and second datasets including by matching a set of attributes. The process then outputs the merged data. The merged data refers to a resulting dataset that matches criteria set in the attributes and can be obtained from at least a subset of different datasets used in the process. Distinct datasets (e.g., datasets from distinct enterprises and/or other distinct data sources) can be merged and/or compared, while providing granular control of which data is seen by which user(s) (e.g., distinct versus duplicate customers, own data versus other's data, subset of a data record, etc.).

FIG. 1 is a flow diagram illustrating an embodiment of a process for data enrichment and matching. This process may be implemented by system 200 of FIG. 2 or system 300 of FIG. 3.

The process begins by obtaining a first dataset associated with a first user from a first data source (100). The first dataset includes entities associated with records from a structured data source such as one with enterprise/business logic, e.g., customer relationship management, marketing automation system, or the like. An example of a dataset further described with respect to FIG. 4.

In various embodiments, a dataset can be imported or otherwise obtained from a data store or third-party provider. The dataset can be prepared by a user as follows. A user (e.g., the first user or another user associated with the first user) imports data that is available in various disparate data sources within their organization into a software application (such as system 200 of FIG. 2 or system 300 of FIG. 3). To import data, in some embodiments, the user does one or more of the following: leverages a native integration built between the application and data source; leverages a third-party integration that is available; and/or imports data from a report that has been generated from the data source.

This data report can be available in either a structured or an unstructured data format. In the case of unstructured data, certain data transformations can be performed that will convert the unstructured data into a structured data format. Once structured data is available, the data attributes that wish to be imported from the report or via the integration are mapped to the data attributes in the application. In cases where certain data attributes are not directly present in the application, custom data objects/attributes can be created thereby giving the flexibility to map data attributes and objects not present in the application. Such imported data can either be directly consumed in a host application or can be stored as a "dataset" for processing by this process. In various embodiments, data is imported from distributed data sources/systems.

The process obtains a corresponding second dataset associated with a second user (102). The second dataset can be prepared and obtained in the same way as the first dataset. In various embodiments, the second user belongs to an organization outside the organization associated with the first user. For example, in a merger between a first company and a second company, the first user belongs to a first company, and the second user belongs to a second company.

The process enriches at least one of the first dataset and the second dataset (104). Enrichment enables higher fidelity matching between the two datasets. The data is enriched and/or augmented, either for the existing data attributes or by adding new data attributes, to create normalized data.

Data that is imported at 100 and 102 may not be complete and/or correct. This could be due to lack of data at the source or because of human error (e.g., typographical errors). In cases where data is not complete or not correct, in various embodiments the data is enriched/augmented in the application after importing from the data source and creating a "dataset". The data enrichment process in some embodiments includes taking either a single row of data or a single attribute of the data (e.g., account name) in a row of data from the dataset in the host application and checking the data value in publicly and privately available data sources that are configured by the application. The data sources can rest outside the host application, be available within the host application, or within another system hosted by the organization that is enriching the data. Once a data match is established, relevant attributes are retrieved from the publicly/privately available data sources. One can also find a match in a public/private data source, retrieve certain data values from the data source for the matching record, then go to another public/private data source and attempt to retrieve additional data attributes/values. Thus, the original data record gets enriched and augmented with additional data values that either did not exist earlier or were incorrect values. This increases accuracy and makes it easier to match data.

The process merges the enriched first dataset and the enriched second dataset including by matching a set of attributes based at least in part on matching corresponding attributes (104). Normalized data is used to identify close (e.g., fuzzy) matches/duplicates with data that is present in another dataset(s) thereby surfacing common and distinct data. In various embodiments, the first and/or second user can specify match criteria via a graphical user interface as further described below. In various embodiments, the process determines first filtered data associated with the first user and second filtered data associated with the second user, where the first filtered data and the second filtered data match filter criteria associated with the first dataset and the corresponding second dataset. This offers privacy or security benefits because it gives users control over what information gets shared with other users or implements privacy/security policies.

The merge is performed taking into the specified match criteria to filter and obtain matching data. For example, a user can specify that "Account" in one dataset maps to "Acct Name" in a second dataset. Using this information, data in column "Account" can be merged with data in column "Acct Name." Filtering can be performed by row or column. The process can suggest some filtering criteria such as what information should be shared between two users. The information to be shared can depend on confidentiality, privacy, or security considerations.

In various embodiments, after importing (and creating) datasets at 100 and 102, the user can share the dataset with another user either within the organization or outside the organization. The user can set certain permissions and privileges on how other users can access/view/perform operations on the data in the dataset or the dataset in its entirety. For example, the user who created (e.g., imported) the dataset can share just the name of the dataset and not necessarily the contents of the dataset. In another case, the user can share the name of the dataset, a few user-selected columns of data in the dataset and not all the columns in the dataset. In another case the user might set permissions that only reveal some or all columns of the data when certain operations (e.g., matching) are performed on the dataset.

In various embodiments, merging the enriched first data set and the enriched second dataset includes combining the enriched first data set and the enriched second dataset, comparing the enriched first data set to the enriched second dataset, and generating metadata based on the comparison of the enriched first data set to the enriched second dataset. For example, the metadata contains information (e.g., a flag) about whether data is common (e.g., similar or the same) to both datasets or distinct to one of the datasets.

Once common or distinct data is identified, the merged data can be output in the form of list such as a list of new potential customers. This is done in some embodiments by suggesting competitors of current customers (either common or distinct). The list of competitors of current customers is generated in some embodiments by leveraging specific techniques like web scraping or comparing it against a database of companies and their competitors in their industries or in other industries.

The process outputs the merged data (106). The merged data can be output to storage, an analysis engine, or for rendering on a graphical user interface, some examples of which are further discussed below. To match data that is available in two or more datasets, in various embodiments, the user provides the datasets that need to undergo the matching exercise and can decide to match the datasets in entirety or handpick the attributes (e.g., column names in a dataset) of the datasets that need to be matched. The application then compares these two datasets according to the instructions provided by the user and looks for matching (or nearly matching) data values. The application can provide a summary of common data records and/or distinct data records. After matching the datasets either all records can be displayed or the records can be displayed based on the permissions/privileges set by the user.

In various embodiments, initial merged results are stored in an intermediate storage. One or more users can interact with the initial results, for example selecting a subset. The selected subset then gets stored in a (final) merged data store. For example, initially 10 rows of merged data are output, a first user selects five of the rows and a second user selects two additional rows, and those seven rows get stored in a final merged data store. One or more users can further interact the data stored in the final merged data store, for example downloading the final dataset to perform actions offline, store it in associated profile in a Web application, or pushing the data into an external data store. The intermediate data store can improve the speed and performance of the system because not all of the intermediate data store is of interest to the users.

Figure 2:
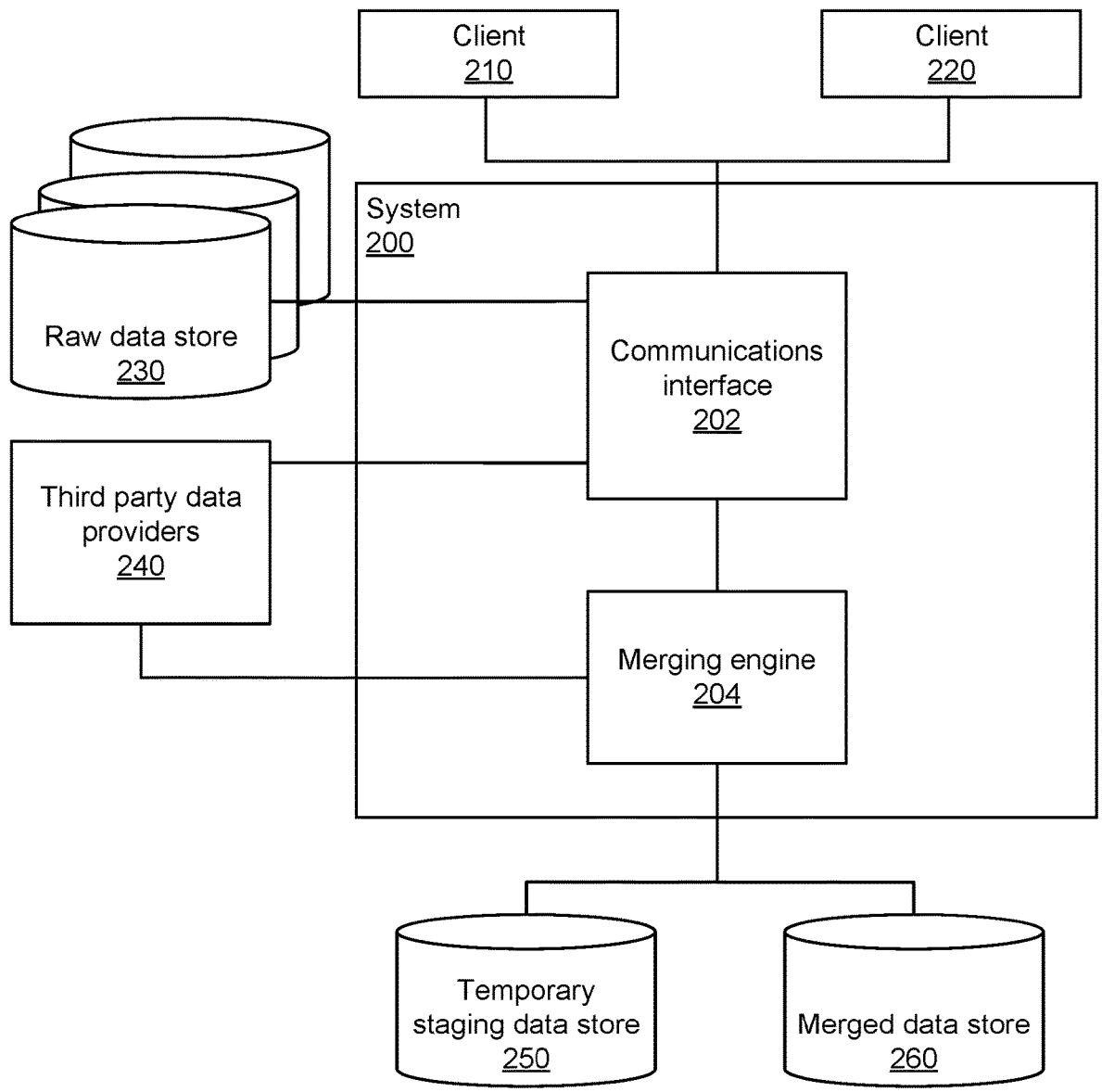
FIG. 2 is a block diagram illustrating an embodiment of a system for data enrichment and matching.

FIG. 2 is a block diagram illustrating an embodiment of a system for data enrichment and matching. As will be apparent, other computer system architectures and configurations can be used to perform data enrichment and matching. Computer system 200, which includes various subsystems as described below, includes at least one microprocessor subsystem (also referred to as a merging engine or a processor) 204. For example, system 200 can be implemented by a single-chip processor or by multiple processors. In some embodiments, system 200 is a general purpose digital processor. Using instructions retrieved from memory, the system controls the reception and manipulation of input data, and the output and display of data on output devices. In some embodiments, system 200 executes/performs the process of FIG. 1.

Various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

An example of system 200 is accessed via a Web application by Pronto Technology, Inc. System 200 is communicatively coupled to a first client 210 and a second client 220. A user of the first client ("first user") and a user of the second client ("second user") can each interact with system 200 to merge or compare data belonging to the first user and the second user. System 200 is configured to perform the process of FIG. 1 to compare or merge distinct datasets.

System 200 includes communications interface 202 and merging engine 204. Data associated with the first user or second user may be kept in a remote location such as raw data store 230 and third party data providers 240. Communications interface 202 is configured to obtain data from raw data store 230 and third party data providers 240. Examples of raw data stores include SalesForce® and Microsoft Dynamics®. Examples of third party data providers include Crunchbase® and ZoomInfo®. An example of communications interface 202 is a Web portal, which can be implemented by a Django® Web framework for example.

Merging engine 204 is configured to compare and/or merge data obtained by the communications interface 202 by performing the process of FIG. 1. The merging engine 204 outputs intermediate results to temporary staging data store 250, which may include unstructured data. One of advantage of using a structureless database for temporary staging data is that there is no limit on the data. The structure of data can be preserved in such a structureless databased using key-values. After merging/comparison is complete, the merging engine outputs merged data to merged data store 260. An example of temporary staging data store 250 is MongoDB®. An example of merged data store 260 is Postgres®.

System 200 can query one or more of the stores 230, 240, 150, 260, or data provider 240 periodically or on-demand to ensure that data remains fresh.

Figure 3:
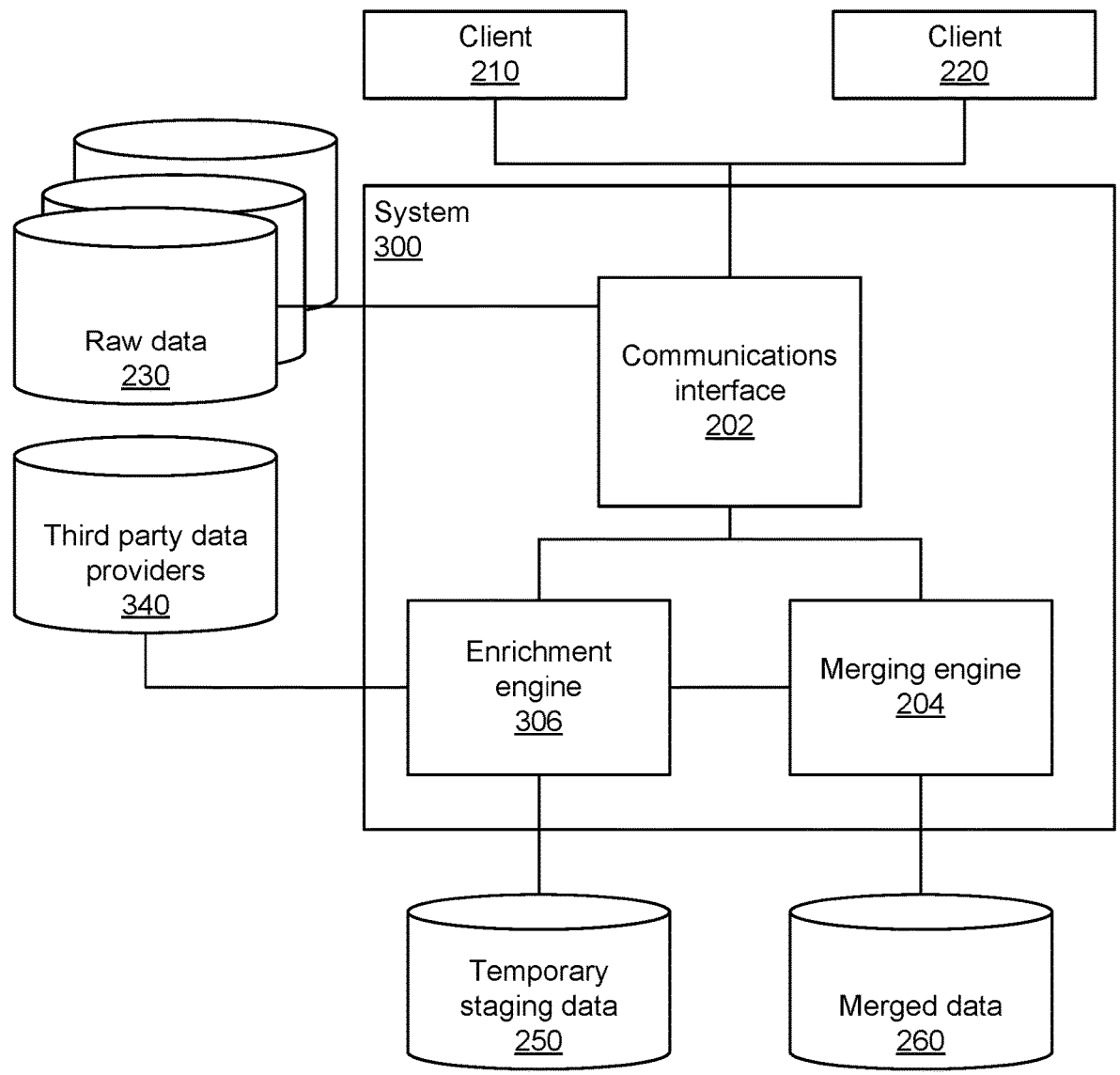
FIG. 3 is a block diagram illustrating an embodiment of a system for data enrichment and matching.

FIG. 3 is a block diagram illustrating an embodiment of a system for data enrichment and matching. Each of the components are like their counterparts in FIG. 2 unless otherwise described. The system 300 includes enrichment engine 306. System 200 calls a third party to perform enrichment or received data that has already been enriched (e.g., from 240) in various embodiments. By contrast, system 300 can perform enrichment locally.

Enrichment engine 306 is configured to enrich data for example by performing 106 of FIG. 1. The enrichment engine can enrich specific rows within a table by updating the row to replace missing or incorrect information. The enrichment engine can also perform additional intelligence related to the data in specific rows, for example noticing a pattern.

The following figures show examples of graphical user interfaces enabling a user to interact with the process of FIG. 1.

FIG. 4 shows an example of a graphical user interface for data enrichment and matching in a state for creating a dataset. This example shows a process of importing data for a user 404. The user interface includes a menu 402 for navigating the Web portal.

Panel 410 shows a current company (Acme Corp) for which a dataset is being retrieved. Associated customers, accounts, or datasets can be displayed by selecting the appropriate links. The information can be displayed in sorted order (alphabetical in this example) and provide options to the user to sort in another way. For example, clicking the arrow next to "Account Name" will cause the accounts to be sorted in reverse alphabetical order.

In this example, the user interface is prompting the user to select accounts from the displayed results to create one or more datasets. The user can select a checkbox corresponding to data to be added to a dataset, and click the "create dataset" button to form a dataset made up of the selected accounts. In this example, no accounts have been selected yet.

Figure 5:
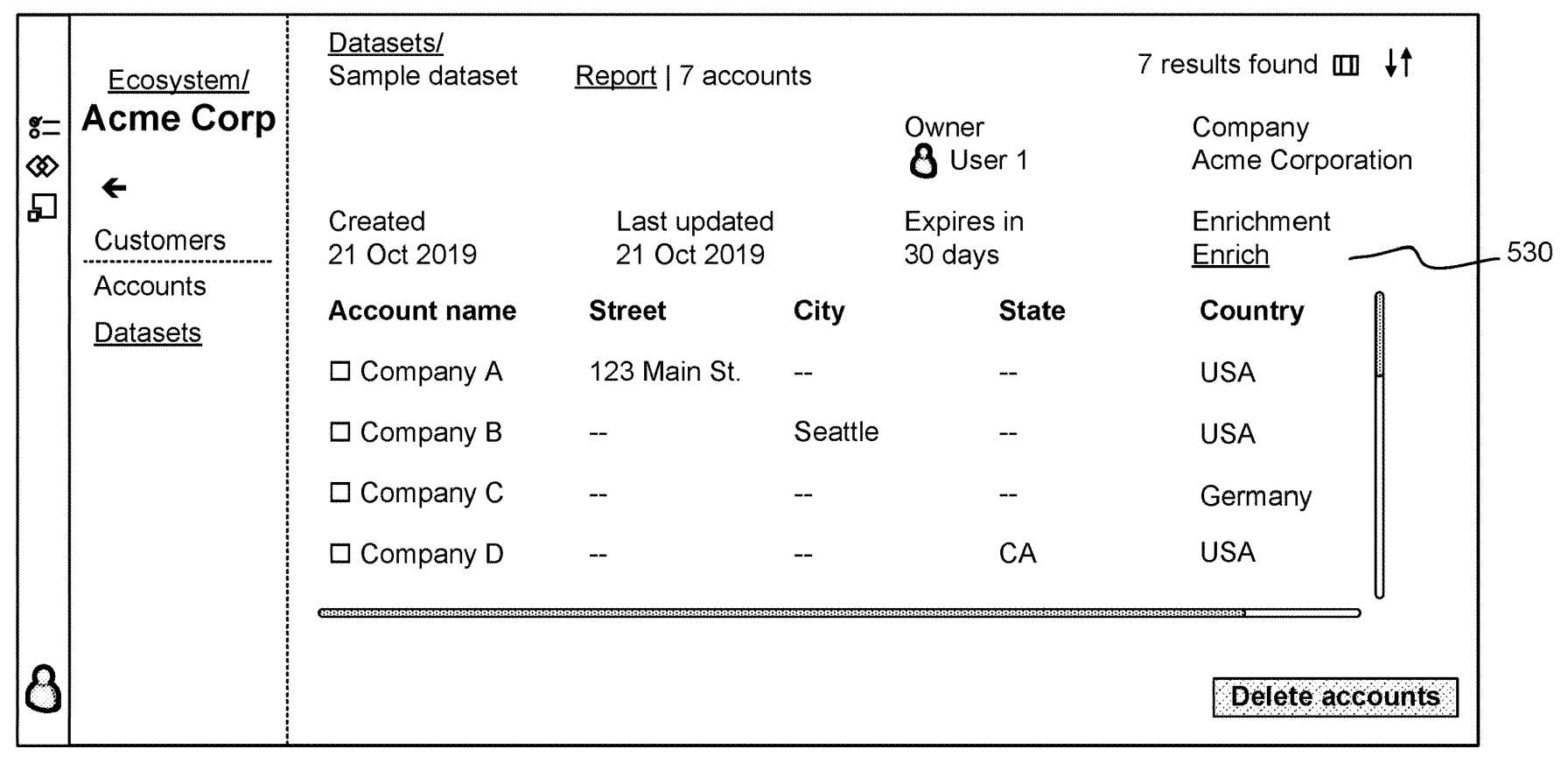

FIG. 5 shows an example of a graphical user interface for data enrichment and matching in a state after importing data prior to enrichment. Each of the components are like their counterparts in FIG. 4 unless otherwise described.

In this example, the dataset is made up of Company A to Company D (and some others not shown here but that can be displayed using the scroll bar. A user can further refine this dataset by selecting an entry to remove the account from the current dataset. As shown, the dataset is displayed along with its owner (User 1), company (Acme Corp), the time of creations (21 Oct. 2019) and last updated (21 Oct. 2019). The dataset can have an associated expiration date (30 days from now in this example) to ensure data freshness, comply with privacy or security regulations, etc.

The user interface includes an "enrich" link 530 that triggers an enrichment process or step (e.g., 104). This link 530 can be accompanied by or replaced by an icon indicating a state of enrichment. For example, prior to enrichment, text or a color in the icon can indicate that the dataset has not been enrichment. For example, the icon is grey prior it enrichment and after enrichment, the icon becomes green.

Figure 6:
FIG. 6 shows an example of a graphical user interface for data enrichment and matching while enrichment is in progress.

FIG. 6 shows an example of a graphical user interface for data enrichment and matching while enrichment is in progress. Each of the components are like their counterparts in FIG. 5 unless otherwise described. Element 602 indicates that enrichment is in progress. In this state, enrichment has just begun so none of the blank (-) fields in section 604 have been updated yet. At the end of enrichment, the blank fields will be populated with a value if one is found.

FIG. 7 shows an example of a graphical user interface for data enrichment and matching while enrichment is in progress. Each of the components are like their counterparts in FIG. 6 unless otherwise described. As shown, the missing street names, cities, and states have been found and filled out in section 704. Element 702 indicates that enrichment is complete.

Figure 8:
FIG. 8 shows an example of a graphical user interface for data enrichment and matching in a state for selecting datasets to match.

FIG. 8 shows an example of a graphical user interface for data enrichment and matching in a state for selecting datasets to match. Each of the components are like their counterparts in FIG. 7 unless otherwise described. A user from a first organization can set permissions so that a user from a second organization can select data sets belonging to the first organization, enrich the data sets, etc. as shown.

In this example, Widget Inc. and Acme Corp want to merge/compare their datasets. As shown, each organization has respective datasets. The datasets are displayed along with their users who have permission to work with dataset, owners, number of accounts, enrichment state, and expiration date. In this example, a user selects "sample dataset 1" from Widget Inc. and "sample dataset 2" from Acme Corp in order to match/merge/compare these two datasets.

Figure 9:
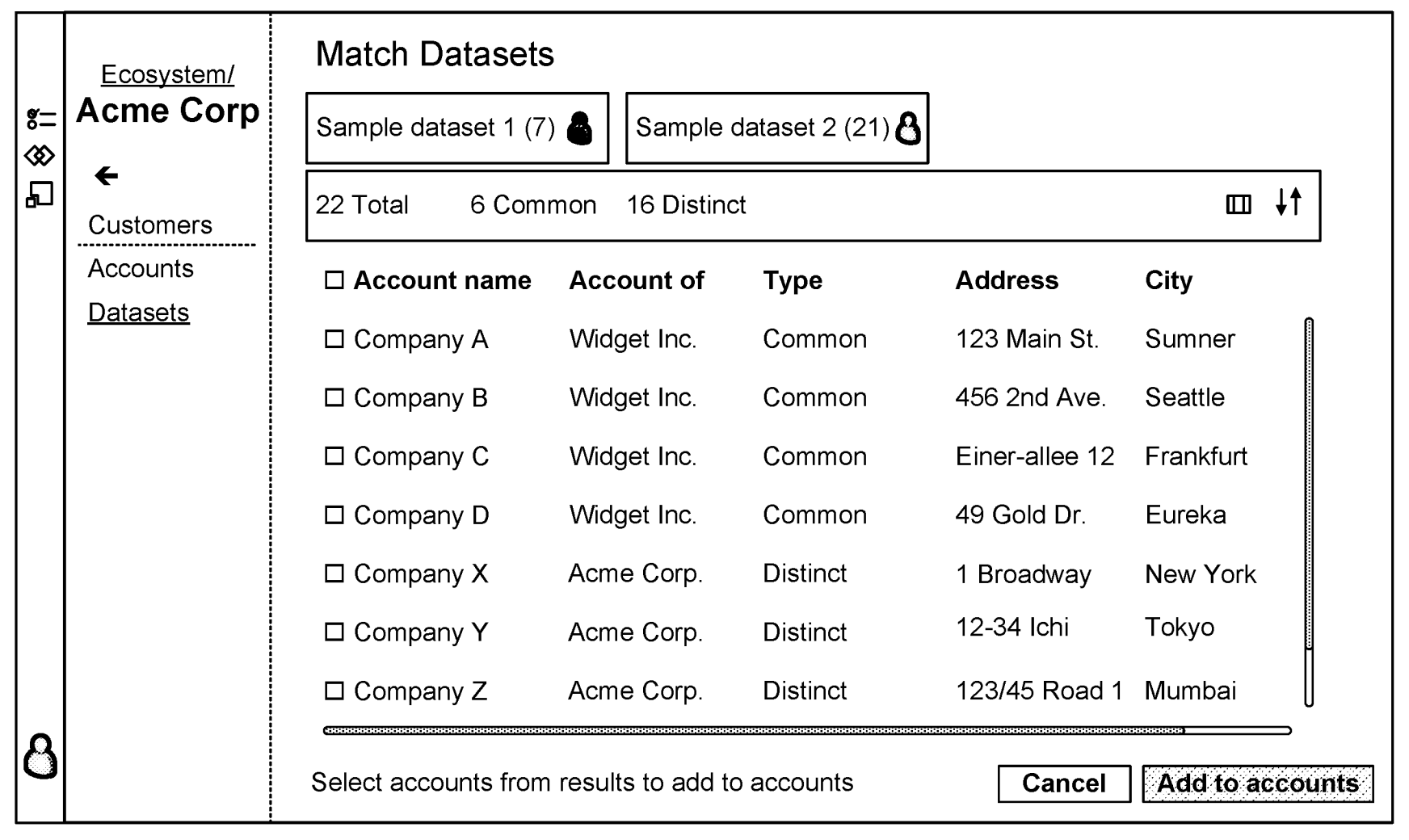

FIG. 9 shows an example of a graphical user interface for data enrichment and matching in a state for matching results of datasets. Each of the components are like their counterparts in FIG. 8 unless otherwise described. As shown, each entry is displayed with whether it is "common" meaning both Widget Inc. and Acme Corp had this data or "distinct" meaning only one of the organizations had this data.

FIG. 10 shows an example of a graphical user interface for data enrichment and matching in a state for matching results of datasets. Each of the components are like their counterparts in FIG. 9 unless otherwise described. This user interface conveys common/distinct data in a different way. The source box below the headings show the source of the data. For example, some of the data came from source "Src 1" while other data came from source "Src 2". Example sources include Dropbox® and BetterCloud®.

As shown, each entry is displayed with whether it is "common" meaning both Widget Inc. and Acme Corp had this data or "distinct" meaning only one of the organizations had this data.

The disclosed data enrichment and matching techniques have many advantages over conventional techniques. In one aspect, overlaps of data between companies (distinct datasets) can be identified whereas typically data is enriched internally to a company. In another aspect, data sources with different data formats (e.g., live data vs. flat file) can be merged. In yet another aspect, datasets for two or more organizations can be merged unlike conventional techniques can only merge datasets for only two organizations or within a single organization.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface configured to:
   obtain a first dataset associated with a first user from a first data source, wherein the first dataset includes records from a structured data source; and
   obtain a corresponding second dataset associated with a second user;
   a processor coupled to the communication interface and configured to:
   enrich at least one of the first dataset and the second dataset;
   merge the first dataset and the second dataset to create an intermediate dataset including by matching a set of attributes based at least in part on matching corresponding attributes, wherein at least one of the first dataset and the second dataset has been enriched;
   store the intermediate dataset in an unstructured data store;
   in response to receiving user input associated with the intermediate dataset, create a merged dataset based at least in part on the intermediate dataset;
   store the merged dataset in a structured data store; and
   output the merged dataset.

2. The system of claim 1, wherein the structured data source includes a customer relationship management system.

3. The system of claim 1, wherein the processor is further configured to:
   determine first filtered data associated with the first user and second filtered data associated with the second user, wherein the first filtered data and the second filtered data match filter criteria associated with the first dataset and the corresponding second dataset.

4. The system of claim 3, wherein at least one of the filter criteria is specified by at least one of the first user and the second user.

5. The system of claim 3, wherein at least one of the filter criteria is pre-defined based at least in part on a security policy.

6. The system of claim 1, wherein the obtained first dataset includes fields specified by the first user to be exposed to other users such that only those fields specified by the first user are displayable to other users.

7. The system of claim 6, wherein the processor is further configured to output the merged dataset including by displaying matching records or common customers that neither the first user nor the second user has.

8. The system of claim 6, wherein the fields include a subset of columns in the first dataset such that columns not in the subset of columns are not displayed to the other users.

9. The system of claim 1, wherein enriching at least one of the first dataset and the second dataset includes augmenting at least one of the first dataset and the second dataset with data from another source.

10. The system of claim 1, wherein enriching at least one of the first dataset and the second dataset includes at least one of: filling in missing information and correcting errors.

11. The system of claim 1, wherein enriching at least one of the first dataset and the second dataset is performed for at least one row in at least one of the first dataset and the second dataset.

12. The system of claim 1, wherein enriching at least one of the first dataset and the second dataset is performed for at least one attribute in data of at least one of the first dataset and the second dataset.

13. The system of claim 1, wherein enriching at least one of the first dataset and the second dataset includes normalizing data.

14. The system of claim 1, wherein merging the first data set and the second dataset includes:
combining the first data set and the second dataset;
comparing the first data set to the second dataset; and
generating metadata based on the comparison of the first data set to the second dataset.

15. The system of claim 14, wherein the metadata includes information about at least one of: commonalities and distinctions in the first data set and the second dataset.

16. The system of claim 1, wherein the processor is further configured to output the merged dataset on a graphical user interface.

17. The system of claim 1, wherein:
the user input on the intermediate dataset includes selection of a first subset of the intermediate dataset by the first user and selection of a second subset of the intermediate dataset by the second user; and
creating the merged dataset includes combining the selection by the first user and the selection by the second user.

18. A method, comprising:
obtaining a first dataset associated with a first user from a first data source, wherein the first dataset includes records from a structured data source;
obtaining a corresponding second dataset associated with a second user;
enriching at least one of the first dataset and the second dataset;
merging the first dataset and the second dataset to create an intermediate dataset including by matching a set of attributes based at least in part on matching corresponding attributes, wherein at least one of the first dataset and the second dataset has been enriched;
storing the intermediate dataset in an unstructured data store;
in response to receiving user input associated with the intermediate dataset, creating a merged dataset based at least in part on the intermediate dataset;
storing the merged dataset in a structured data store; and
outputting the merged dataset.

19. A computer program product embodied in a non-transitory computer readable medium and comprising computer instructions for:
obtaining a first dataset associated with a first user from a first data source, wherein the first dataset includes records from a structured data source;
obtaining a corresponding second dataset associated with a second user;
enriching at least one of the first dataset and the second dataset;
merging the first dataset and the second dataset to create an intermediate dataset including by matching a set of attributes based at least in part on matching corresponding attributes, wherein at least one of the first dataset and the second dataset has been enriched;
storing the intermediate dataset in an unstructured data store;
in response to receiving user input associated with the intermediate dataset, creating a merged dataset based at least in part on the intermediate dataset;
storing the merged dataset in a structured data store; and
outputting the merged dataset.

\* \* \* \* \*